US012765468B2

(12) United States Patent
Shenk et al.

(10) Patent No.: US 12,765,468 B2
(45) Date of Patent: Oct. 20, 2026

(54) DUAL PIVOT DROP FLOOR

(71) Applicant: CNH Industrial America LLC, New Holland, PA (US)

(72) Inventors: Jonathan Shenk, Lititz, PA (US); Jason Gahres, Robesonia, PA (US)

(73) Assignee: CNH Industrial America LLC, New Holland, PA (US)

( * ) Notice: Subject to any disclaimer, the term of this patent is extended or adjusted under 35 U.S.C. 154(b) by 336 days.

(21) Appl. No.: 18/417,680

(22) Filed: Jan. 19, 2024

(65) Prior Publication Data

US 2025/0234811 A1 Jul. 24, 2025

(51) Int. Cl.
*A01F 15/10* (2006.01)

(52) U.S. Cl.
CPC .................................. *A01F 15/106* (2013.01)

(58) Field of Classification Search
CPC ............................... A01F 15/106; A01F 15/10
See application file for complete search history.

(56) References Cited

U.S. PATENT DOCUMENTS 5,255,501 A * 10/1993 McWilliams ........... A01F 15/07 100/88
9,468,149 B2 10/2016 Derscheid et al.
9,549,506 B2 1/2017 McClure et al.
9,839,181 B2 12/2017 Singh et al.
2016/0219790 A1* 8/2016 McClure ............... A01F 15/106
2017/0071133 A1* 3/2017 Singh ...................... A01F 15/08
2020/0404852 A1 12/2020 Hackert et al.

FOREIGN PATENT DOCUMENTS

DE 19841598 A1 3/2000
EP 3053430 B1 6/2021
WO 2020240426 A1 12/2020

OTHER PUBLICATIONS

Extended European Search Report for EP Application No. 25152568.9 dated Jun. 18, 2025 (Jun. 18, 2025)—7 pages.

* cited by examiner

*Primary Examiner* — Brad Harcourt
(74) *Attorney, Agent, or Firm* — CM Law PLLC; Stephen J. Weed

(57) ABSTRACT

Provided is an agricultural machine having: a chassis; a rotor operatively connected to the chassis to rotate about a rotor axis in a rotation direction; a bottom floor located adjacent to the rotor and extending along the rotor axis from a first lateral side to a second lateral side; and a respective linkage operatively connecting each lateral side of the bottom floor to the chassis. The bottom floor extends along the rotation direction from a bottom floor leading end to a bottom floor trailing end, and the bottom floor is spaced from the rotor to define a crop flow passage between the rotor and the bottom floor. The linkage is configured to allow the bottom floor to move about multiple rotation axes to move away from the rotor axis by application of force generated against the bottom floor in the crop flow passage.

18 Claims, 11 Drawing Sheets

DUAL PIVOT DROP FLOOR

FIELD OF THE INVENTION

The present invention pertains to agricultural crop collecting and processing devices, such as agricultural balers or the like.

BACKGROUND OF THE INVENTION

Agricultural balers are used to consolidate and package crop material for storage and handling of the crop material for later use. In an exemplary operation, a mower-conditioner cuts and conditions the crop material for windrow drying in the sun. When the cut crop material is dried, a baler, for example a round baler or a square baler, travels along the windrows to pick up the crop material and form it into bales.

In a typical baler, the cut crop material is gathered from the ground at the front of the baler, drawn into a pickup assembly, and into a crop feeding channel where the material can be further cut before being introduced into a bale-forming chamber. The crop feeding channel is generally defined between a rotor and a bottom floor. The bottom floor supports the crop material as it passes through the crop feeding channel and is pushed by the rotor to the bale forming chamber. The crop feeding channel defines a narrower region in the crop flow path, and clogging or plugging of the crop feeding channel is a common problem, especially if the harvester is being operated at higher speeds and thus passing greater amounts of crop material through the crop feeding channel at a given time. Once a clog occurs, the harvester must be stopped to remove the plug from the crop feeding channel, reducing harvesting efficiency.

Some harvesters are designed to mitigate clogging by making the crop feeding channel expandable, which can be done by making the bottom floor movable to some degree away from the rotor. As the bottom floor moves away from the rotor the height of the crop feeding channel increases, and temporarily increases the volume of crop material that can be passed through, possibly preventing the formation of an obstruction, or releasing an existing obstruction. Example of such devices are described in U.S. Pat. Nos. 9,549,506 and 9,839,181, which are incorporated herein by reference in their entireties.

Many movable bottom floors are mounted to the chassis to pivot about a single point. Actuators, such as one or more telescoping hydraulic actuators, may be provided at each lateral side of the bottom floor and operated to affirmatively control the position of the bottom floor. Springs also may be provided to allow the bottom floor to pivot by action of an outside force (e.g., the rotor pushing the crop material into the bottom floor). In some cases, the bottom floor might be movable about a virtual pivot or about multiple rotation points, but such mechanisms require multiple actuators at each lateral end of the bottom floor to properly control the position of the bottom floor throughout its range of travel.

While various bottom floor mechanisms are known, the inventors have determined that the state of the art can still be advanced.

BRIEF SUMMARY OF THE INVENTION

In a first exemplary aspect, there is provide an agricultural machine comprising: a chassis; a rotor operatively connected to the chassis to rotate about a rotor axis in a rotation direction; a bottom floor located adjacent to the rotor and extending along the rotor axis from a first lateral side to a second lateral side; and a respective linkage operatively connecting each lateral side of the bottom floor to the chassis. The bottom floor extends along the rotation direction from a bottom floor leading end to a bottom floor trailing end, and is spaced from the rotor to define a crop flow passage between the rotor and the bottom floor. The respective linkages are configured to allow the bottom floor to move about multiple rotation axes to move away from the rotor axis by application of force generated against the bottom floor in the crop flow passage.

In a second exemplary aspect, there is provided a method of operating an agricultural machine comprising a chassis; a rotor operatively connected to the chassis to rotate about a rotor axis in a rotation direction; a bottom floor located adjacent to the rotor and extending along the rotor axis from a first lateral side to a second lateral side, the bottom floor extending along the rotation direction from a bottom floor leading end to a bottom floor trailing end, wherein the bottom floor is spaced from the rotor to define a crop flow passage between the rotor and the bottom floor; and a respective linkage operatively connecting each lateral side of the bottom floor to the chassis and configured to allow the bottom floor leading end and the bottom floor trailing end to move away from the rotor axis by application of force generated against the bottom floor in the crop flow passage. The exemplary method comprises: receiving crop material in the crop flow passage at the bottom floor leading end; moving the bottom floor leading end away from the rotor axis by a force generated at a first location on the bottom floor by the crop material; moving the crop material towards the bottom floor trailing end; and moving the bottom floor trailing end away from the rotor axis by a force generated at a second location on the bottom floor by the crop material.

This summary is illustrative only and is not intended to be in any way limiting. Other aspects, inventive features, and advantages of the devices or processes described herein will become apparent in the detailed description set forth herein, taken in conjunction with the accompanying figures.

BRIEF DESCRIPTION OF THE SEVERAL VIEWS OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms “forward”, “rearward”, “left” and “right”, when used in connection with the agricultural machine and/or components thereof are usually determined with reference to the direction of forward operative travel of a vehicle towing the machine, or a self-propelled vehicle incorporating the machine, but they should not be construed as limiting. The term "longitudinal" refers to the forward travel direction. The term "transverse" and "lateral" refer to a direction perpendicular to the forward travel direction and generally parallel to the ground surface when the machine is in operation.

Figure 1:
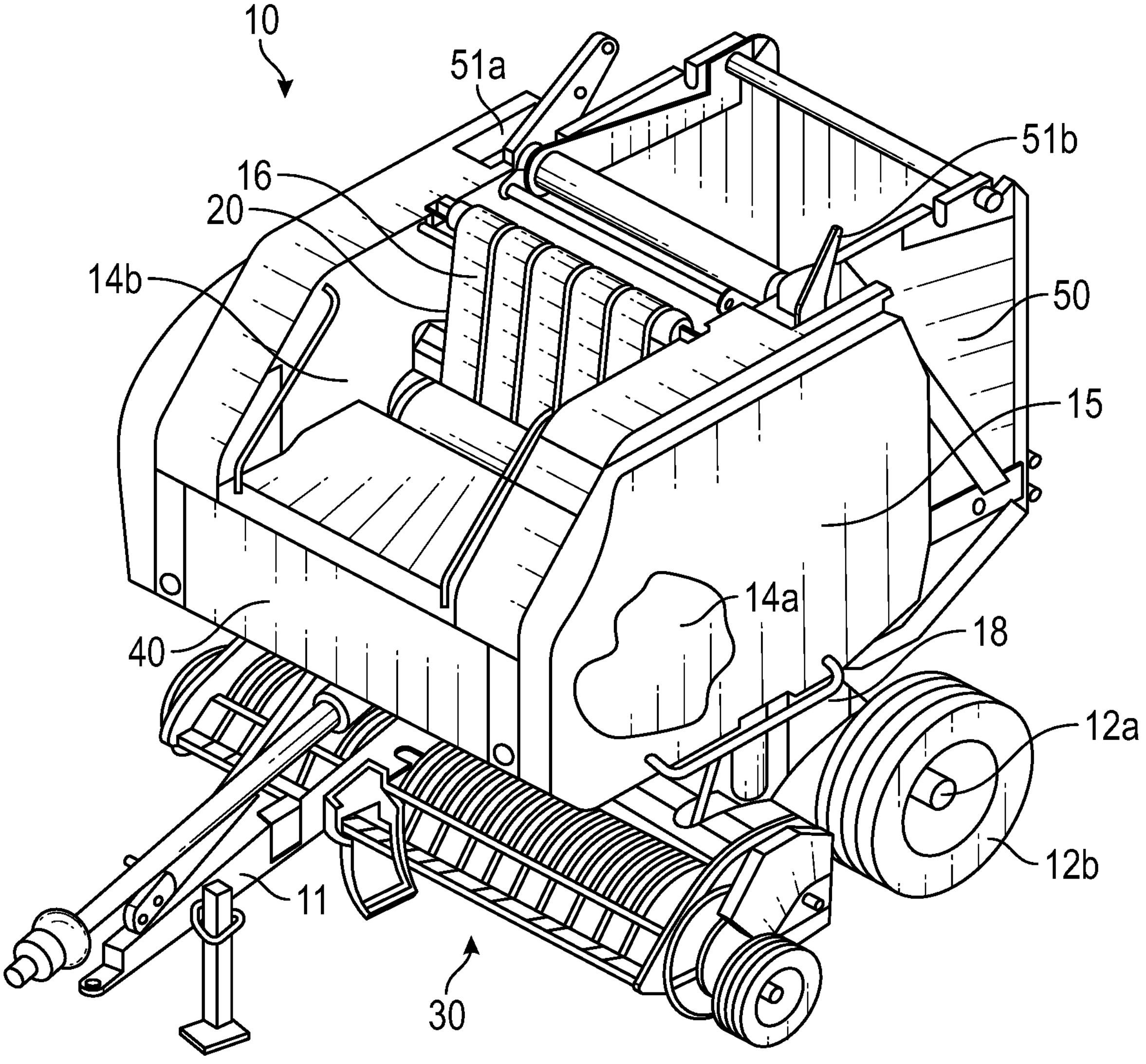
FIG. 1 is an isometric view of a prior art baler.

FIG. 1 illustrates a prior art round baler 10 configured as a towed machine. The baler 10 has a chassis 18 from which a tongue 11 extends in a forward operating direction, and a transverse axle 12*a* to which a pair of wheels 12*b* (only one being shown) is mounted to support the baler 10 for movement on the ground. The chassis 18 supports a series of belts 16 and floor rolls (not shown), which, together with one or more sidewalls 14*a*, 14*b*, cover panels 15, and the like, collectively form a bale-forming chamber 20. As the baler moves forward, cut crop material is picked up by a transverse pickup 30 and fed through a harvesting assembly (not shown) into the bale-forming chamber 20 where the crop material is formed into a cylindrically shaped bale by conveyor belts 16. The bale is then optionally wrapped with twine, netting or a plastic wrap by a wrapping mechanism housed behind a shield 40, and finally is discharged from the baler 10 by pivoting the tailgate 50 upwards about pivot points 51*a*, 51*b*. A baler also may be constructed as a self-propelled machine, and/or may be constructed to form the crop material into square or rectangular bales. These and other details of conventional balers will be understood, and need not be discussed in more detail herein.

Figure 2:
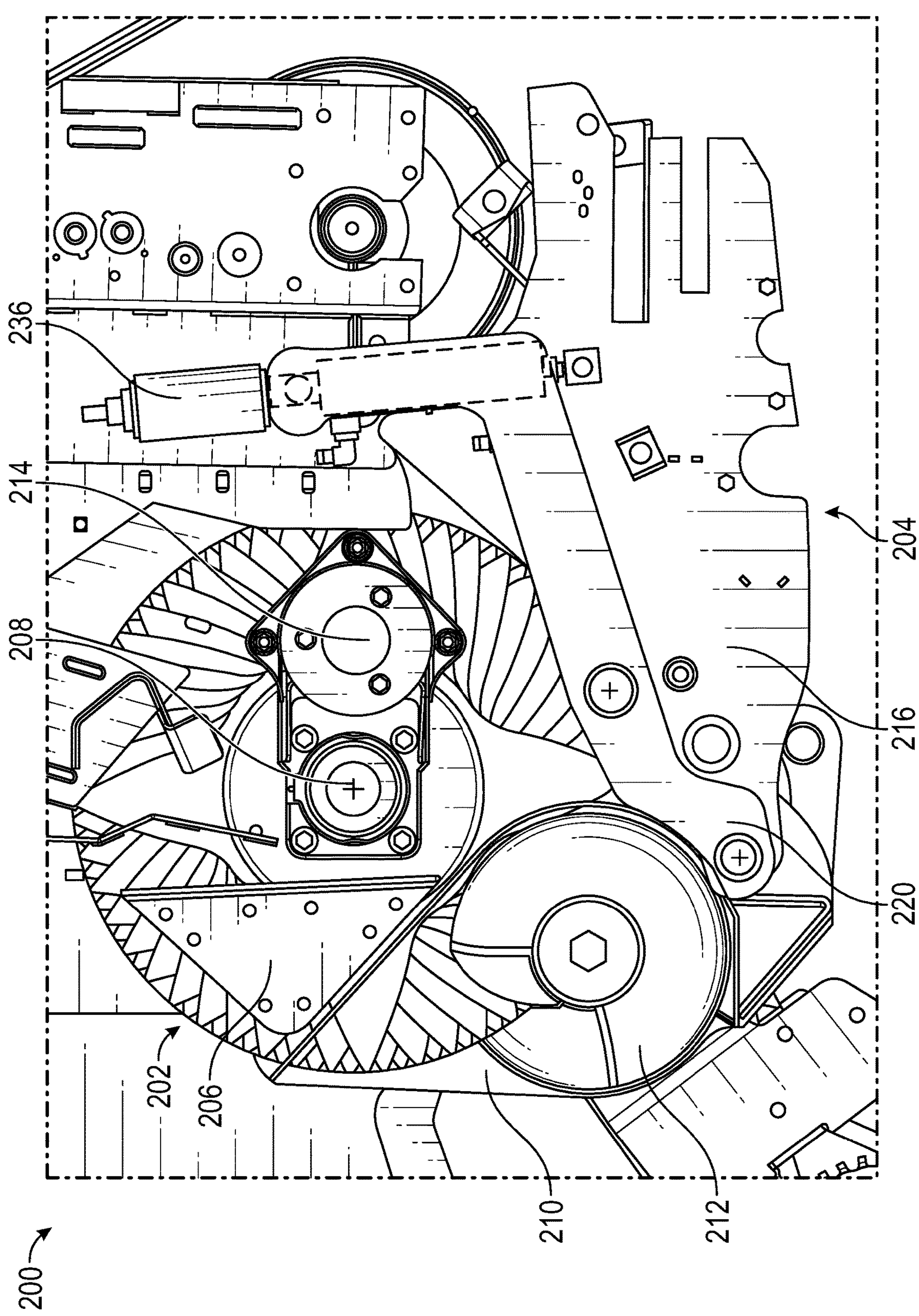
FIG. 2 is a side view of a harvester assembly.
Figure 3:
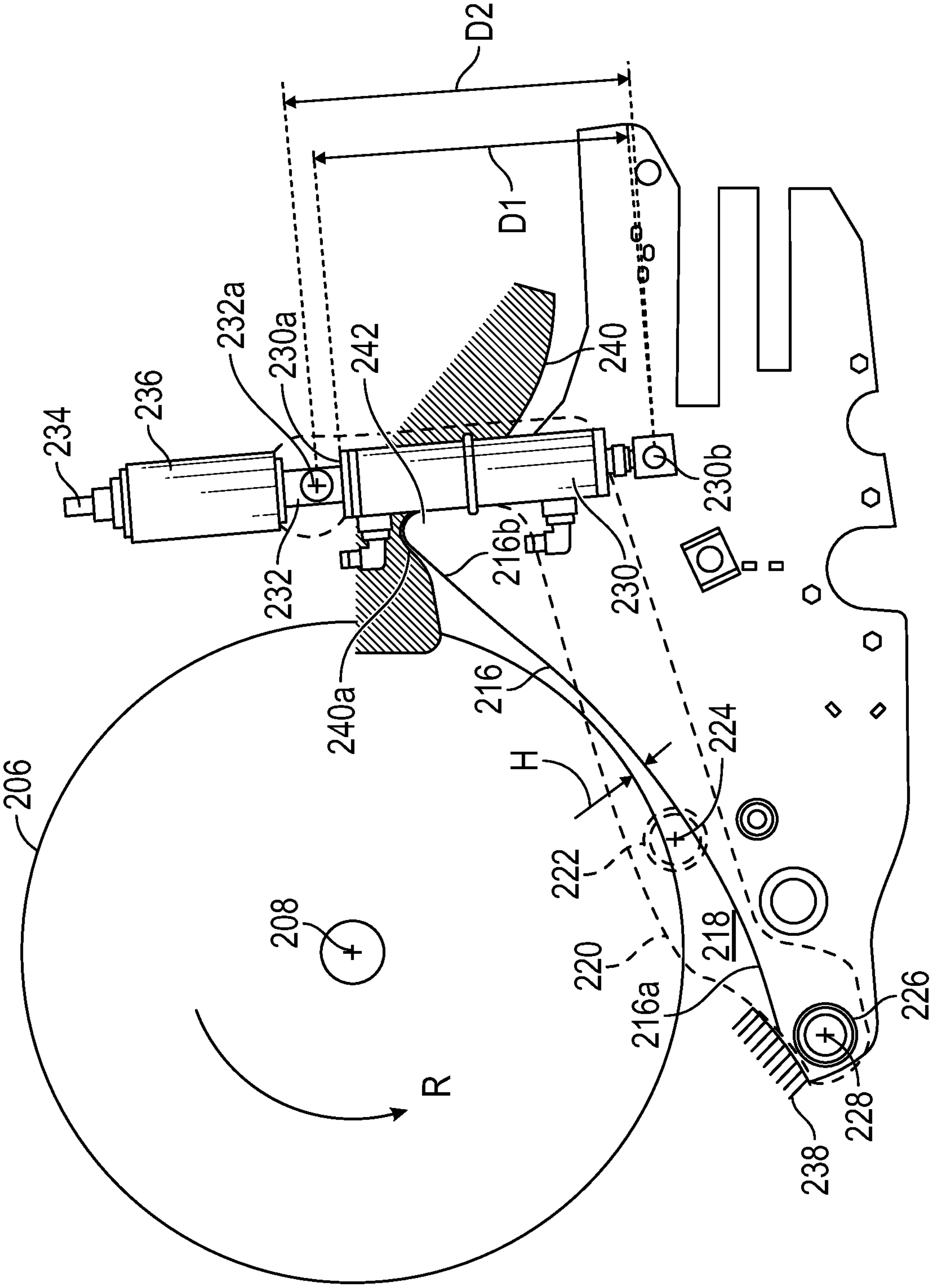
FIG. 3 is a side view of the harvester assembly of FIG. 2 with certain details removed.

An exemplary embodiment of a harvester assembly 200 that may be used with balers in general, with the baler 10 of FIG. 1 being but one example, is shown in FIGS. 2 and 3. For brevity, the embodiments herein are described in relation to their use in agricultural balers. However, it will be appreciated by the person of ordinary skill in the art that harvester assemblies 200 and features of harvester assemblies 200, such as those described herein, may be used in other types of similar machinery, such as choppers, to obtain similar results. For example, embodiments may be applied to agricultural machines having a rotary crop-moving mechanism that faces a floor or wall creating a space that is subject to clogging or the formation of a plug of crop material. Embodiments are not intended to be limited to use in balers, except as where specifically identified as being so limited.

The exemplary harvester assembly 200 may be provided as an integral part of the baler (i.e., the parts being formed and connected directly to the baler chassis 18), or it may be provided partially or entirely as a removable subassembly. The harvester assembly 200 generally includes a feeder assembly 202 that is fixed to the baler chassis 18, and a bottom floor assembly 204 that is movable relative to the feeder assembly 202.

The feeder assembly 202 includes a rotor 206 that is rotatably mounted to the baler chassis 18, either directly or as part of a subassembly forming the feeder assembly 202, to rotate about a rotor axis 208 that extends along the lateral direction (into the page in FIGS. 2 and 3). The rotor 206 comprises a plurality of knives and/or other crop-processing mechanisms, as known in the art. In normal operation, the rotor 206 rotates in a rotation direction R as shown by the arrow (counterclockwise in the illustrations). The harvester assembly 200 also includes a sidewall 210 at each lateral end to form lateral boundaries to contain crop material (the nearest sidewall 210 is removed to better illustrate the interior components). Augers 212 may be provided at or near the lateral ends to guide crop material transversely towards the rotor 206, as known in the art. The harvester assembly 200 also includes a transmission 214 to drive the rotor 206, and may include counter knives (not shown) and other conventional features.

The bottom floor assembly 204 generally includes a bottom floor 216 that is located adjacent to the rotor 206 and extends along the rotor axis 208 in the lateral direction from a first lateral side to a second lateral side. The bottom floor 216 extends along the rotation direction R from a bottom floor leading end 216*a* to a bottom floor trailing end 216*b*. The bottom floor 216 defines a surface that faces and is spaced from the rotor 206 to define a crop flow passage 218. Rotation of the rotor 206 in the rotation direction R drives crop material along the crop flow passage 218 from the bottom floor leading end 216*a* to the bottom floor trailing end 216*b*, and from there to downstream processing components (e.g., the bale-forming chamber 20). The bottom floor assembly 204 also may include features such as movable counter knives and the like, which, for clarity, are not shown here.

The crop flow passage 218 has a height H, as defined as the distance between the outer perimeter of the rotor 206 and the nearest point on the bottom floor 216. The shape and position of the bottom floor 216 dictates the height H at any given point along the crop flow passage 218. FIG. 3 shows the bottom floor 216 being concave facing the rotor 206, with a larger radius than the rotor 206, such that the height H is variable, and decreases and then increases along the crop flow direction.

The bottom floor 216 is connected at each lateral side to a respective linkage that allows the bottom floor leading end 216*a* and bottom floor trailing end 216*b* to move towards and away from the rotor axis 208. In the shown example, each linkage comprises a rocker arm 220 having a rocker pivot 222 (e.g., bearing or bushing) that connects the rocker arm 220 to the chassis 18 so that the rocker arm 220 can rotate relative to the chassis 18 about a rocker axis 224. The rocker axis 224 may be parallel to and offset from the rotor axis 208, but this is not strictly required. The rocker arm 220 is shown in broken lines in FIG. 3 to show portions of the bottom floor assembly 204 and other features located behind it.

The rocker arm 220 also includes a bottom floor pivot 226 that connects the rocker arm 220 to a lateral end of the bottom floor 216, so that the rocker arm 220 can rotate relative to the bottom floor 216 about a bottom floor rotation axis 228 that preferably is parallel to the rotor axis 208. The bottom floor pivot 226 preferably is located immediately adjacent to the bottom floor leading end 216*a*, but this is not required in all cases.

At each lateral end of the bottom floor 216, one or more actuators 230, but preferably a single actuator 230, is connected between the rocker arm 220 and the bottom floor 216 (i.e., one single actuator 230 at one lateral end, and one single actuator 230 at the other lateral end). Each actuator 230 has a first operating end 230*a* that is operatively connected to the rocker arm 220, and a second operating end 230*b* that is operatively connected to the bottom floor 216. The rocker pivot 222 may be located along the rocker arm 220 between the bottom floor pivot 226 and the first operating end 230*a*, but this is not necessarily required in all embodiments.

The actuator 230 may comprise any mechanism suitable to selectively displace the first operating end 230*a* relative to the second operating end 230*b* in a controlled manner. In the shown example, the actuator 230 is a hydraulic piston and cylinder assembly, with the first operating end 230*a* at the end of the cylinder, and the second operating end 230*b* at the end of the piston (e.g., at a bearing that connects the piston to the bottom floor assembly 204, so that telescopic expansion and contraction of the piston relative to the cylinder cause the first and second operating ends 230*a*, 230*b* to move away from and towards each other, respectively. Such telescoping hydraulic actuators are generally known in the art and need not be described in more detail herein.

Other alternative actuators 230 may comprise electrical motors, pneumatic motors, and so on. Each single actuator 230 may comprise one or more mechanisms that are connected at the first and second operating ends 230*a*, 230*b* as described above. For example, a single actuator 230 may be provided in the form of a single hydraulic piston and cylinder assembly such as shown, or as two or more parallel hydraulic piston and cylinder assemblies that are connected to the same first and second operating ends 230*a*, 230*b* and operated simultaneously to effectively form a single actuator. A single actuator 230 also may include a linkage, such a slider (described below), bell crank, multi-bar linkage, or the like, to transmit motion, as known in the art.

In use, the actuator 230 is operated to selectively move the bottom floor 216 towards and away from the rotor axis 208. In this example, telescopically contracting the actuator 230 moves the first and second operating ends 230*a*, 230*b* closer together, to move the bottom floor trailing end 216*b* closer to the rotor axis 208 and decrease the height H primarily at the downstream end of the crop flow passage 218, and telescopically expanding the actuator 230 moves the first and second operating ends 230*a*, 230*b* further apart, to move the bottom floor trailing end 216*b* farther from the rotor axis 208 and increase the height H primarily at the downstream end of the crop flow passage 218. Such movement may be desirable to set a desired operating height H for particular crop conditions, to help evacuate a plug of crop material that becomes lodged between the rotor 206 and the bottom floor 216 (i.e., by increasing the height H), to provide room for service access, etc. The amount of relative motion can be modified by selecting the actuator 230 stroke length, the locations of the first and second operating ends 230*a*, 230*b*, and so on.

Figure 4A:
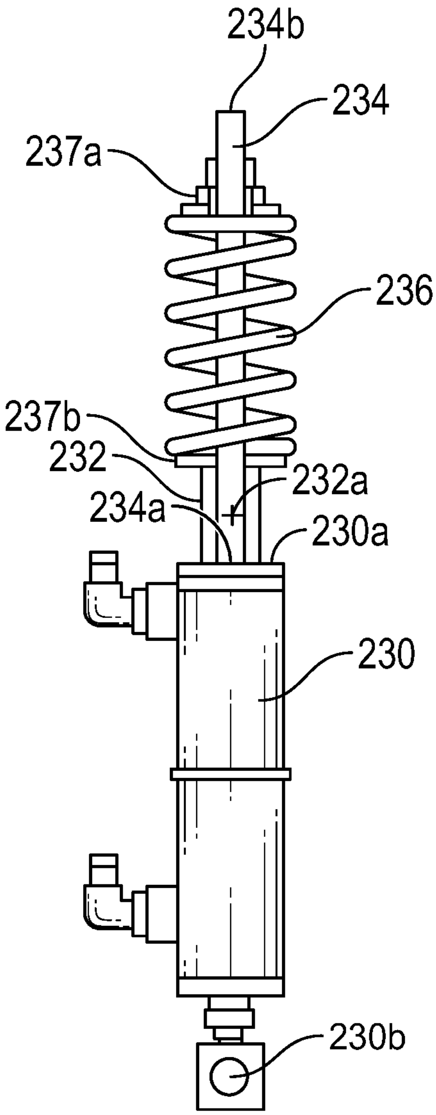
FIGS. 4A and 4B are partially cut away side views of an actuator and spring assembly, shown with the spring extended in FIG. 4A and compressed in FIG. 4B.
Figure 4B:
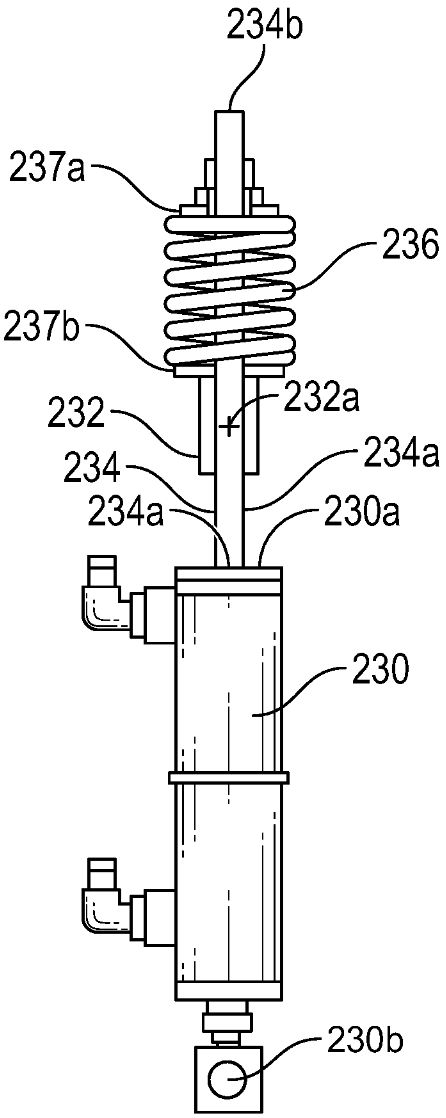

Referring now also to FIGS. 4A and 4B, the actuator 230 is secured to the rocker arm 220 at the first operating end 230*a* by a movable connection that allows the first operating end 230*a* to move relative to the rocker arm 220 between a first position (FIG. 4A) and a second position (FIG. 4B). In this example, the first operating end 230*a* is mounted to the rocker arm 220 by a sliding connection. The sliding connection has a bearing 232 that is secured to the rocker arm 220, and a shaft 234 that is secured to the first operating end 230*a* and configured to slide along the bearing 232. The bearing is mounted to the rocker arm 220 at a bearing pivot 232*a* that extends along the lateral direction to allow the bearing 232 to rotate in a plane parallel to the rocker arm 220. The shaft 234 is secured at its proximal shaft end 234*a* to the first operating end 230*a* of the actuator 230, and extends through the bearing 232 to a distal shaft end 234*b* that is spaced from the proximal shaft end 234*a*. The shaft 234 and bearing 232 have respective sliding surfaces, such as a bushing or linear ball bearing provided in the bearing 232, and a corresponding polished and/or greased exterior surface on the shaft 234.

It will be apparent from the foregoing that the first operating end 230*a* can move from a first position proximal to the bearing 232 to a second position further spaced from the bearing 232, as the shaft 234 slides along the bearing 232. Consequently, the second operating end 230*b* moves away from the rotor axis 208 as the first operating end 230*a* moves from the first position to the second position (assuming that the actuator 230 remains at the same state of extension—i.e., the actuator 230 is not operated to move the first and second operating ends 230*a*, 230*b* towards or away from each other). Thus, the movable connection allows the bottom floor 216 to move independently of the operation of the actuator 230, and, in the absence of a downward travel stop, even further than is able by operation of the actuator 230 alone.

A spring 236 is provided to control the operation of the movable connection. In this case, the spring 236 is located between the bearing 232 and the distal shaft end 234*b*, and captured in place between a distal thrust plate 237*a* that is secured to the shaft 234, and a proximal thrust plate 237*b* that is between the spring 236 and the bearing 232. As the first operating end 230*a* of the actuator 230 moves away from the bearing 232, the spring 236 is compressed between the thrust plates 237*a*, 237*b*. This generates a resilient force that biases the first operating end 230*a* back towards the bearing 232, and thus towards the first position as shown in FIG. 4A.

The spring 236 may comprise any suitable mechanism, such as a coil spring (shown), a torsion or leaf spring, a resilient elastomeric or polymeric material, a pressurized air bag, or pneumatic piston and cylinder assembly or accumulator, and so on. Preferably, only a single spring 236 is provided at each end of the bottom floor 216, but this is not strictly required in all cases.

The harvester assembly 200 also includes travel stops that are positioned on the chassis 18 (either directly or via a harvester assembly 200 substructure or the like) to control the movement range of the bottom floor 216. For example, as shown in FIG. 3, a first stop surface 238 is located adjacent to the bottom floor leading end 216*a*, and a second stop surface 240 is located adjacent to the bottom floor trailing end 216*b*. The stop surfaces 238, 240 are configured to be contacted by the bottom floor assembly 204 to prevent upwards motion thereof. More specifically, the first stop surface 238 is positioned to limit travel of the bottom floor leading end 216*a* towards the rotor axis 208, and the second stop surface 240 is positioned to limit travel of the bottom floor trailing end 216*b* towards the rotor axis 208.

One or both stop surfaces 238, 240 also may be configured to help guide the bottom floor 216 as it moves. For example, the illustrated exemplary second stop surface 240 includes a concave recess 240*a* that loosely receives a corresponding convex protrusion 242 located on the bottom floor assembly 204 (e.g., the very end of the trailing end 216*b*), to provide a pivot location about which the bottom floor 216 can rotate under certain circumstances, such as described below.

Figure 7:
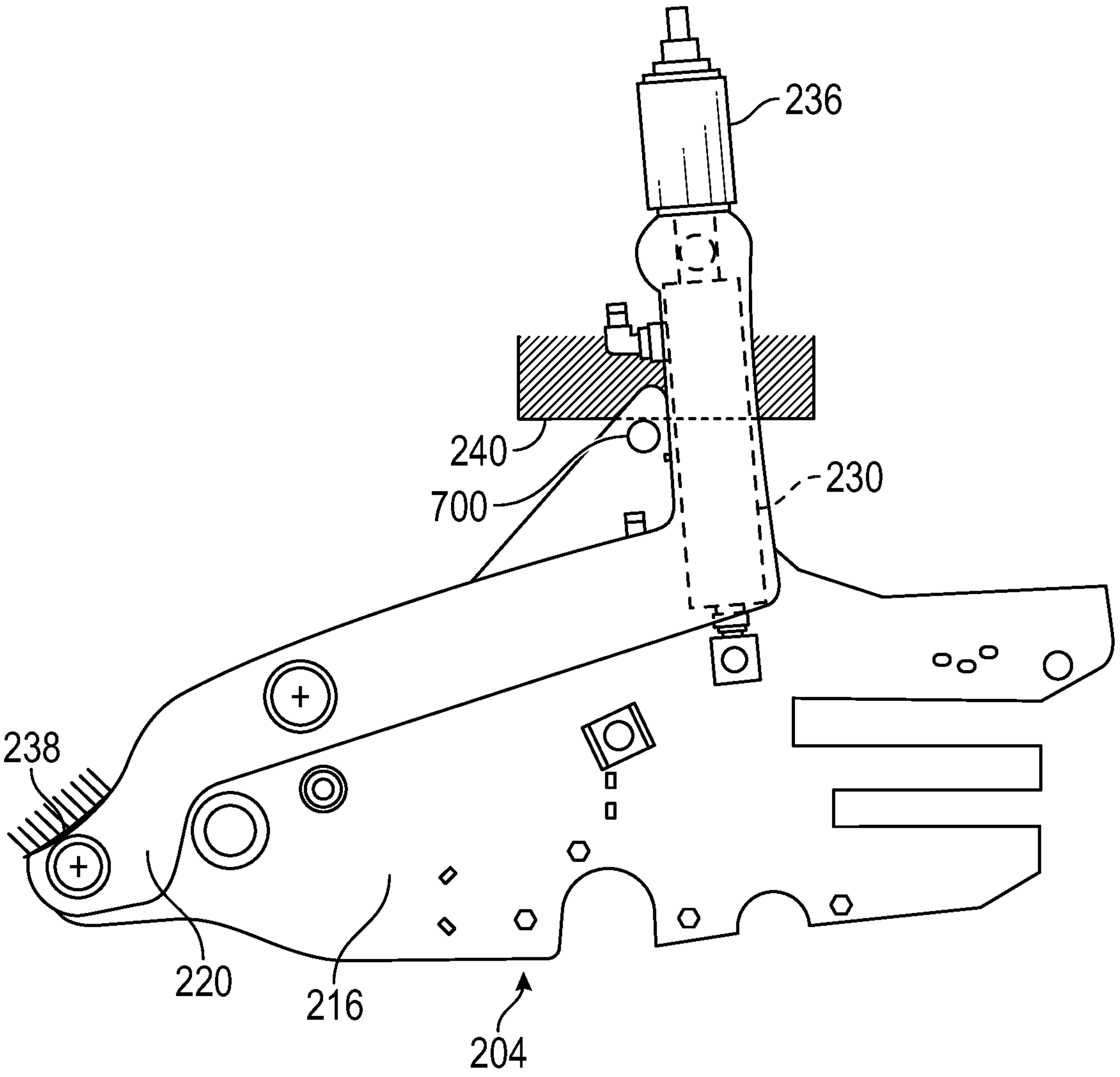
FIG. 7 is an alternative embodiment of a harvester assembly with certain details removed.

It will be appreciated that the first and second stop surfaces 238, 240 can be located to contact any suitable part of the bottom floor assembly 204. For example, the first stop surface 238 may be positioned to contact the rocker arm 220 near the bottom floor pivot 226, and the second stop surface 240 may be positioned to contact the bottom floor trailing end 216*b*. In other cases, contact may be made at other locations. For example, the bottom floor assembly 204 may include additional protrusions or surfaces that contact the stop surfaces 238, 240 to prevent motion towards the rotor axis 208. An example of one such alternative arrangement is shown in FIG. 7, in which the second stop surface 240 is provided as a generally horizontal first surface, and the bottom floor assembly 204 includes a second surface defined by a pin 700 or another shape (e.g., a bar or an upper edge of the bottom floor trailing end 216*b*) that contacts the second stop surface 240 in a sliding manner. In this case, the pin 700 can slide in the fore-aft direction along the second stop surface 240 to allow an additional measure of movement to help prevent binding of the assembly during operation. To prevent possible binding, the second stop surface 240 and pin 700 or other contact surface may have any shape that allows a degree or sliding motion between them (e.g., the planar second stop surface 240 may be perfectly flat or have some curvature). Various operating states of the harvester assembly 200 are shown and described in relation to FIGS. 3 and 5A-5E.

FIG. 3 shows the harvester assembly 200 in a first operating state. The actuator 230 is positioned with the second operating end 230*b* a first distance D1 from the first operating end 230*a*. In this state, the first operating end 230*a* of the actuator 230 is biased by the spring 236 against the bearing 232, with the bearing pivot 232*a* a second distance D2 from the second operating end 230*b*. The bottom floor leading end 216*a* is prevented from moving towards the rotor axis 208 by contact between the bottom floor assembly 204 and the first stop surface 238, and the bottom floor trailing end 216*b* is prevented from moving towards the rotor axis 208 by contract between the bottom floor assembly 204 and the second stop surface 240. This represents the state in which the crop flow passage 218 has its minimum height H. The spring 236 resiliently holds the bottom floor 216 at a minimum angle relative to the rocker arm 220 about the bottom floor rotation axis 228, effectively scissoring these components towards a more "closed" position.

In operation, obstructions, such as plugs of crop material, occasionally enter the crop flow passage 218. As this happens, the rotor 206 presses on the obstruction, thus generating a force F against the bottom floor 216. At this point, cutting action of knives and other forces might break up the obstruction without moving the bottom floor assembly 204, so that the system continues to operate in the state shown in FIG. 3. However, in some cases, the obstruction will not break up, and the force F will increase enough to cause the bottom floor assembly 204 to displace as shown in FIG. 5A.

Figure 5A:
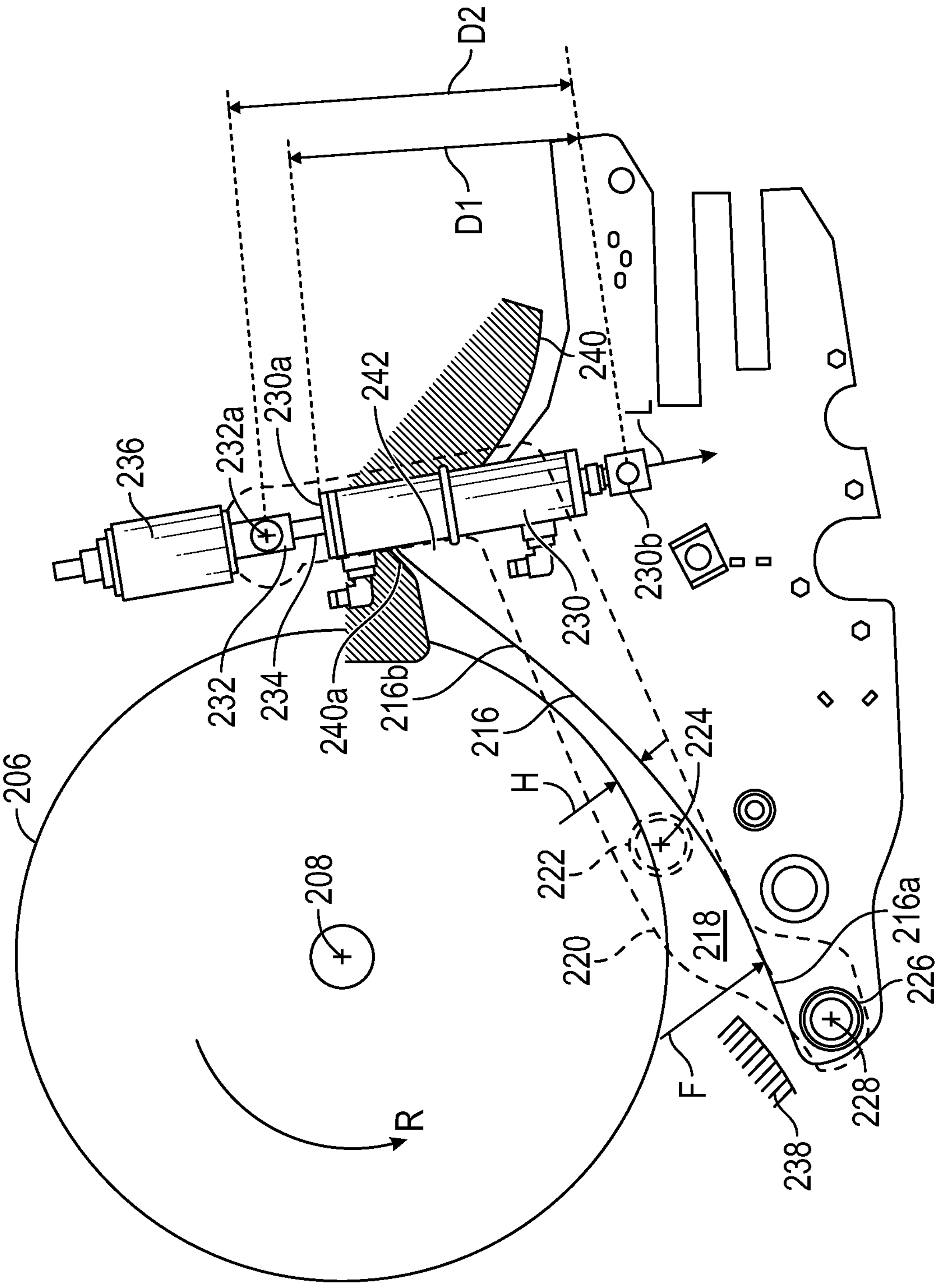
FIGS. 5A-5E illustrate the harvester assembly of FIGS. 2 and 3 in various operating states.

FIG. 5A shows the state in which the obstruction is too large to pass through the crop flow passage 218 without easily compressing to fit the existing space. Here, the obstruction generates the force F against the bottom floor 216, such as described above, which initially acts in front of the rocker pivot 222. The force F is positioned to rotate the rocker arm 220 and the bottom floor 216 downwardly about the rocker pivot 222 (counterclockwise as shown in the illustration). However, the motion of the parts is constrained to a degree by contact between the bottom floor trailing end 216*b* and the second stop surface 240. In this state, the force Fis conveyed via the intervening structure of the bottom floor assembly 204 to generate a downward load L at the second operating end 230*b* of the actuator 230. This downward load L pulls against the actuator 230, but the actuator 230 is locked in its current state of extension by the internal hydraulic fluid. Thus, the downward load L is conveyed via the actuator 230 to the first operating end 230*a* and from there, via the shaft 234, to the distal thrust plate 237*a* and the opposite end of the spring 236. The load L pulls the distal thrust plate 237*a* to compress the spring 236 against the proximal thrust plate 237*b* and the bearing 232. As the spring 236 compresses, the first operating end 230*a* of the actuator 230 moves away from the bearing 232 to a second position, which allows the second distance D2 between the bearing pivot 232*a* and the second operating end 230*b* to increase.

As the second distance D2 increases, the rocker arm 220 and bottom floor 216 rotate relative to each other about the bottom floor pivot 226 to spread apart. As this happens the bottom floor 216 pivots down (counterclockwise as shown in the illustration) with the center of rotation being approximately at the interacting concave surface 240*a* and convex protrusion 242 (the actual pivot axis can move, and the convex protrusion 242 might slide along the second stop surface 240). At the same time, the rocker arm 220 pivots down (counterclockwise as shown in the illustration) about the rocker pivot 222. Thus, bottom floor leading end 216*a* moves away from the rotor axis 208 to increase the height H of the crop flow passage 218 primarily at the floor leading end 216*a*.

Figure 5B:
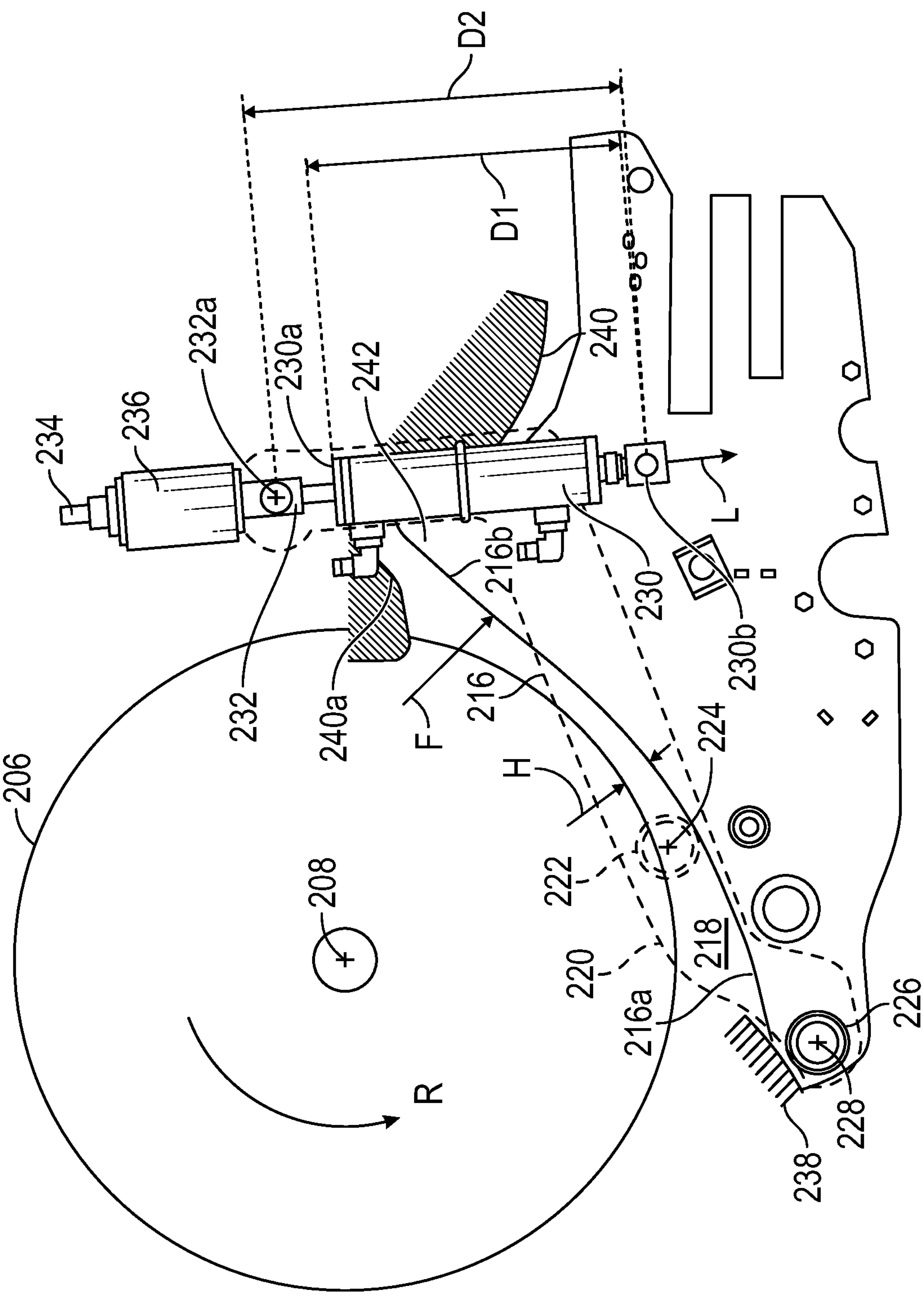

As the obstruction moves backwards along the crop flow passage 218, the force F generated by the rotor 206 acting on the obstruction migrates from the bottom floor leading end 216*a* to the bottom floor trailing end 216*b*, leading to the state shown in FIG. 5B. Here, the force F no longer acts in front of the rocker pivot 222, and now pushes the back of the rocker arm 220 down. As this happens, rocker arm 220 and the rest of the bottom floor assembly 204 rotates up (clockwise as shown in the illustration) until the bottom floor assembly 204 (e.g., the forward end of the rocker arm 220) contacts the first stop surface 238. However, the force F still generates the load L to compress the spring 236. Thus, the height H of the crop flow passage 218 remains increased, now primarily at the bottom floor trailing end 216*b*, to allow more room for the obstruction to pass.

It will be understood that the spring 236 may be preloaded to define a minimum magnitude of force necessary to move the bottom floor 216 in response to the force F. Thus, the movement described above can be reserved for cases in which the obstruction is particularly large and incompressible.

Figure 5C:
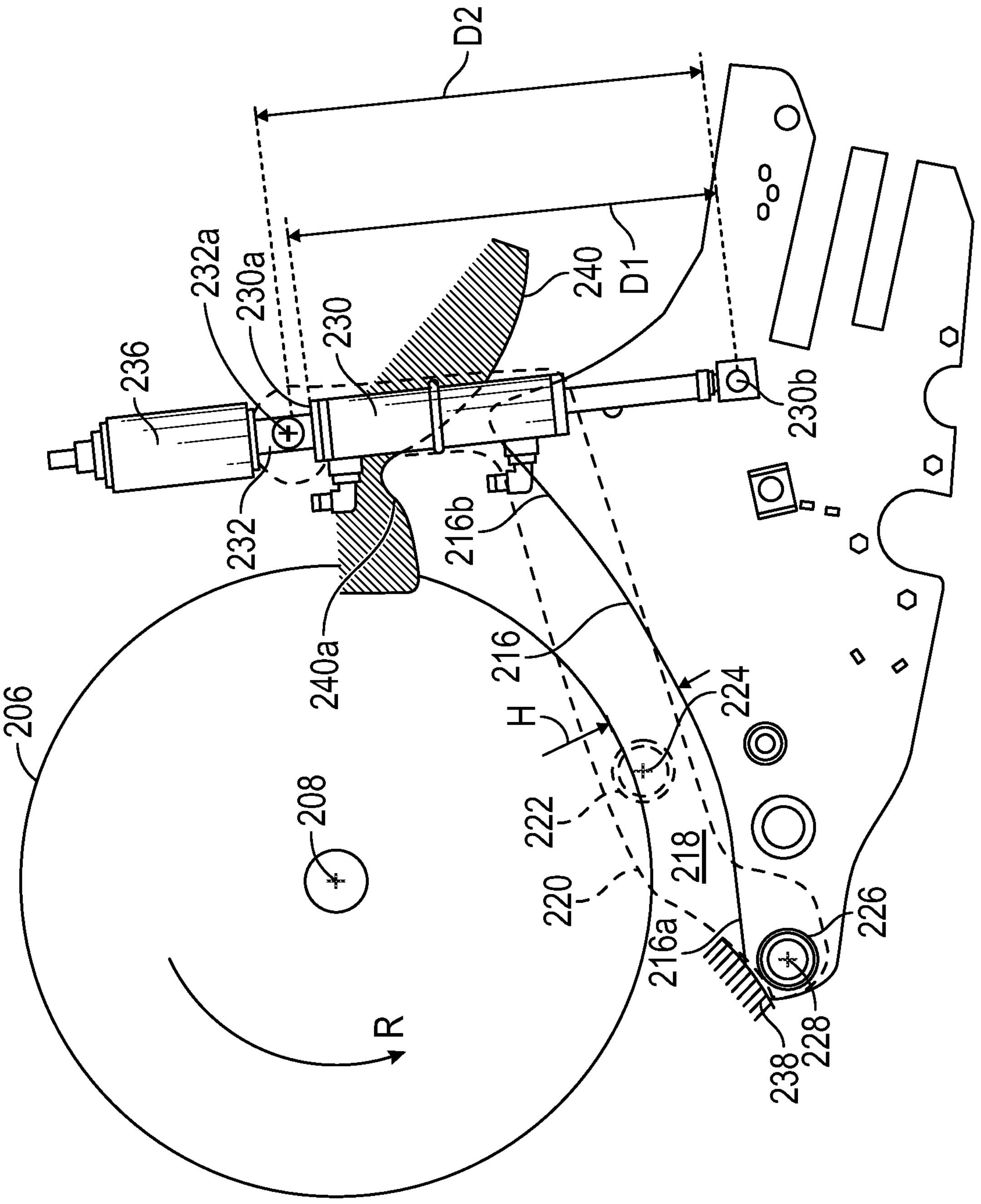

FIG. 5C shows a state in which the actuator 230 is extended by moving the second operating end 230*b* away from the first operating end 230*a*, to thereby increase the first distance D1. In this state, the bottom floor leading end 216*a* is prevented from moving towards the rotor axis 208 by contact between the bottom floor assembly 204 and the first stop surface 238. However, extending the actuator 230 rotates the bottom floor 216 relative to the rocker arm 220 about the bottom floor pivot 226, and thereby moves the bottom floor trailing end 216*b* away from the rotor axis 208 to increase the height H of the crop flow passage 218 primarily at the bottom floor trailing end 216*b*. As the bottom floor 216 rotates about the bottom floor pivot 226, the bottom floor trailing end 216*b* might move out of contact with the second stop surface 240. In this state, the first operating end 230*a* of the actuator 230 remains in contact with the bearing 232. As noted above, operation of the actuator 230 in this way can alter operating properties to account for different crop conditions, help clear plugged crop materials, and provide other benefits.

Figure 5D:
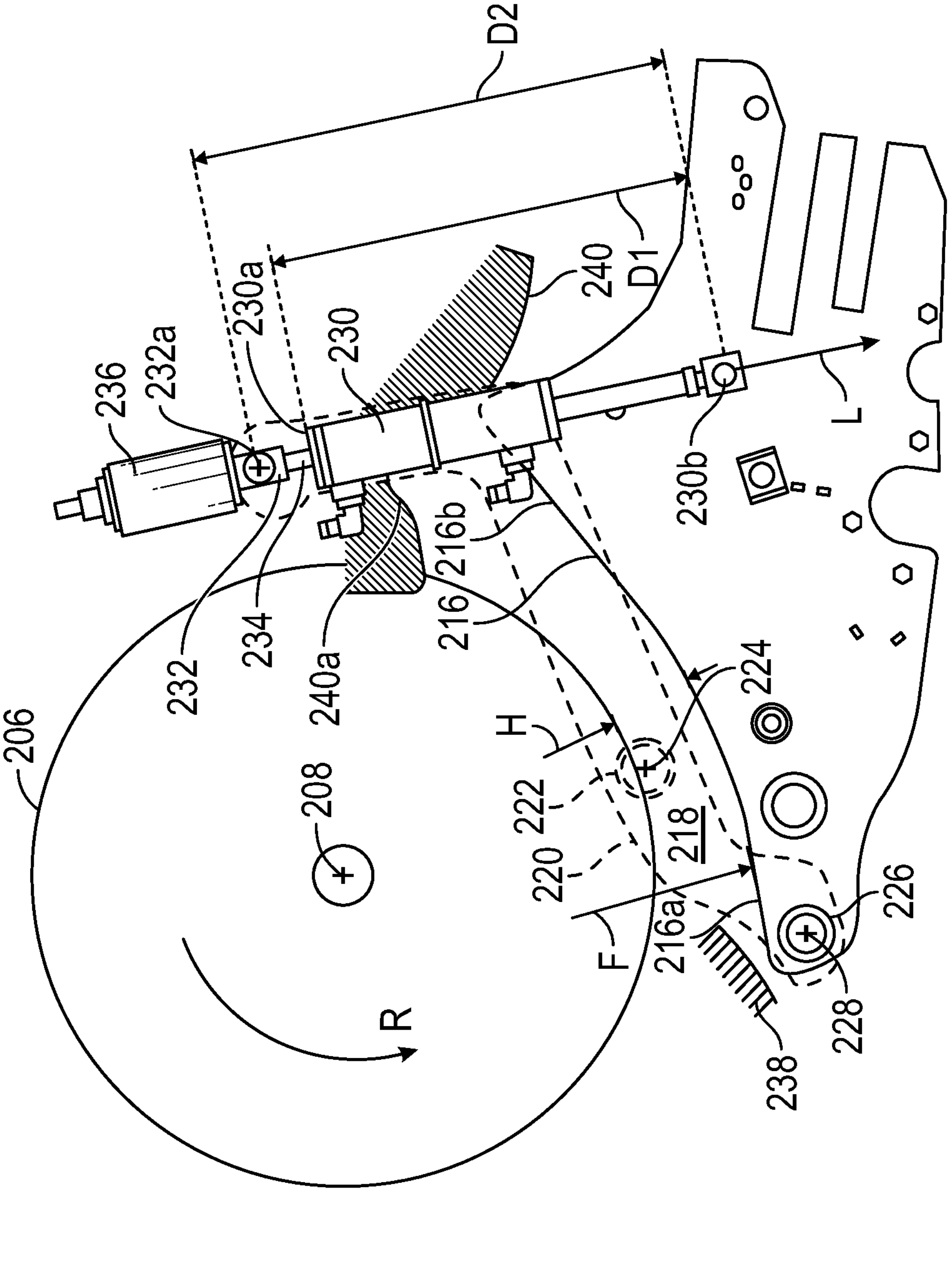

FIG. 5D shows operation of the bottom floor assembly 204 when the actuator 230 is extended (as in FIG. 5C), and a force F is generated against the bottom floor 216 at or near the bottom floor leading end 216*a*. The force F is applied in front of the rocker pivot 222, and thus it causes the rocker arm 220 to rotate down (counterclockwise in the shown illustration) about the rocker pivot 222. As the rocker arm 220 rotates, the front of the bottom floor assembly 204 moves away from the first stop surface 238, and the rear of the bottom floor assembly 204 moves towards the second stop surface 240. If the plug or other obstruction is small enough, this movement might be sufficient to increase the height H of the crop flow passage 218 to allow the obstruction to pass, before the bottom floor assembly 204 contacts the second stop surface 240. If this happens, the bottom floor assembly 204 will return to the position shown in FIG. 5C when the obstruction passes through the entire crop flow passage 218.

If the obstruction is sufficiently large, it will move the bottom floor assembly 204 into contact with the second stop surface 240. Operation from here is essentially the same as described in relation to FIG. 5A. In short, the force Fis conveyed via the intervening structure of the bottom floor assembly 204 to generate a downward load L at the second operating end 230*b* of the actuator 230, and the downward load L compresses the spring 236. Thus, the first operating end 230*a* of the actuator 230 moves away from the bearing 232 to a second position, which allows the second distance D2 between the bearing pivot 232*a* and the second operating end 230*b* to increase. This allows the bottom floor 216 and the rocker arm 220 to rotate relative to each other about the bottom floor pivot 226. However, as in the case of FIG. 4A, contact between the bottom floor assembly 204 and the second stop surface 240 forms a contact point (which can be a sliding contact point depending on the geometry of the parts) about which the bottom floor rotates 216, causing the rocker arm 220 and the bottom floor forward end 216*a* to move downwards. This further increases the height H of the crop flow passage 218, primarily at the bottom floor leading end 216*a*, to allow the obstruction to pass rearwardly from the bottom floor leading end 216*a* to the bottom floor trailing end 216*b*.

Figure 5E:
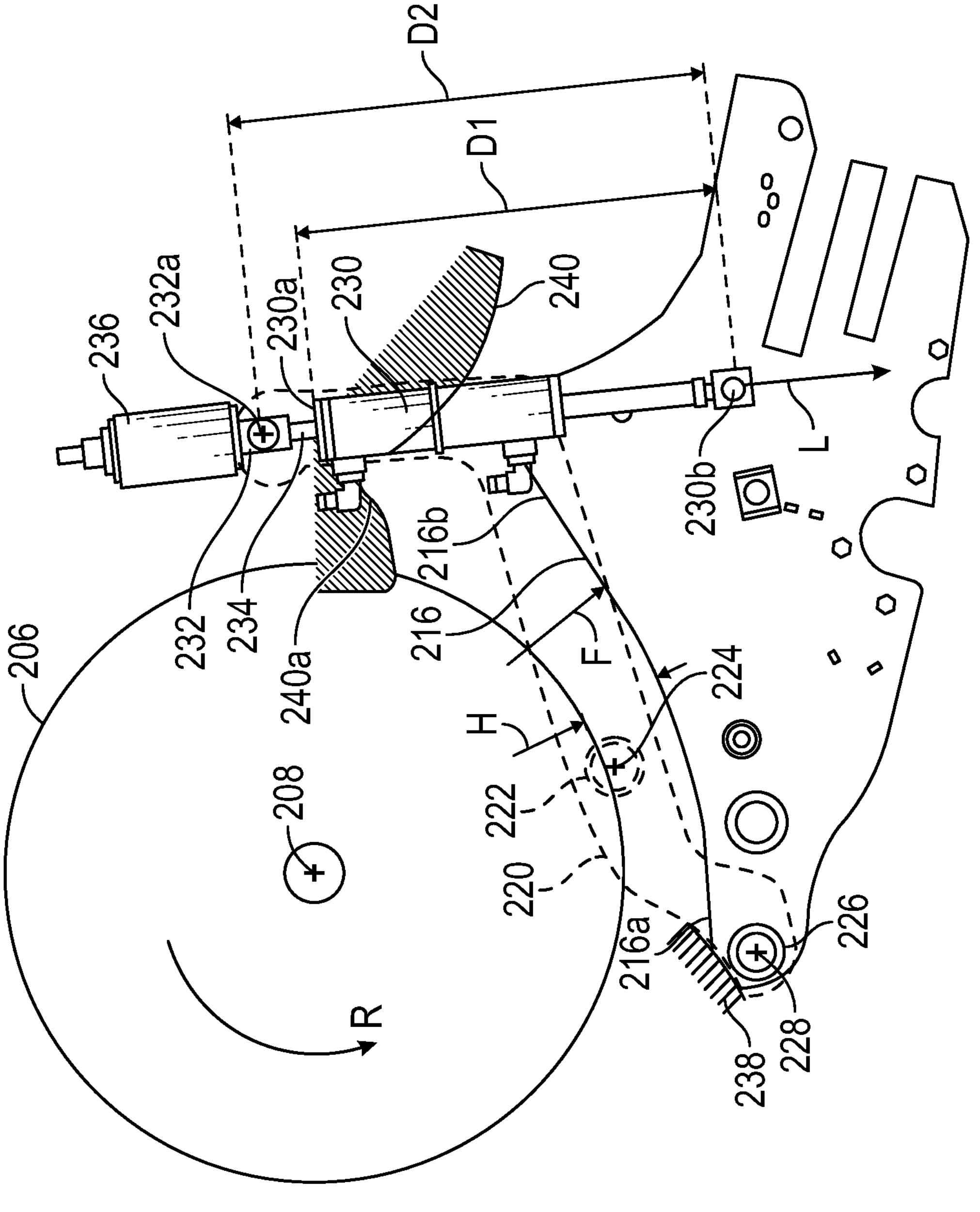

As the obstruction moves backwards along the crop flow passage 218, the force F migrates to the bottom floor trailing end 216*b*, leading to the state shown in FIG. 5E. Here, the force F no longer acts in front of the rocker pivot 222, and instead pushes the back of the rocker arm 220 down. As this happens, the rocker arm 220 and the rest of the bottom floor assembly 204 rotates up (clockwise in the shown view) until the bottom floor assembly 204 contacts the first stop surface 238. However, the force F still generates the load L to compress the spring 236. Thus, the height H of the crop flow passage 218 remains increased, primarily at the bottom floor trailing end 216*b*, to allow additional room for the obstruction to pass.

It will be appreciated that, upon encountering (or anticipating) an obstruction that will lead to the states described in relation to FIGS. 5A and 5B, the machine operator or an automated control system might extend the actuator 230 to help clear the obstruction. In this case, the operation will proceed generally as explained in relation to FIGS. 5C-E. It will also be appreciated that the actuator 230 can be operated during a clogging situation, leading to a hybrid of the states shown in FIGS. 5A-5C. For example, upon reaching the state in FIG. 5A, an operator might extend the actuator 230 to transition to a state as shown in FIGS. 5D and 5E.

While the bottom floor 216 is mounted to the chassis 18 by two discrete pivot connections (rocker pivot 222 and bottom floor pivot 226), it will be appreciated from the foregoing that the bottom floor 216 can rotate about multiple pivot axes to achieve the illustrated movement. In particular, the bottom floor 216 rotates about a first pivot axis at the bottom floor trailing end 216*a*, and then about a second pivot axis at the bottom floor leading end 216*a*. The pivot axes are not necessarily discrete throughout any particular portion of the overall range of movement—that is, the pivot axis can migrate as the bottom floor assembly 204 articulates, such that the multiple pivot axes are a collection of discrete locations along a path of one or more moving and/or virtual pivot axes.

It is also noted that, in some embodiments, the bottom floor assembly 204 may be configured to remain in contact with the second stop surface 240 at all times (i.e., all states of extension of the actuator 230). In this case, the force F will be transmitted to generate the load L on the second operating end 230*b* of the actuator 230 in any case in which the obstruction is larger than the width of the crop flow passage 218.

Figure 6:
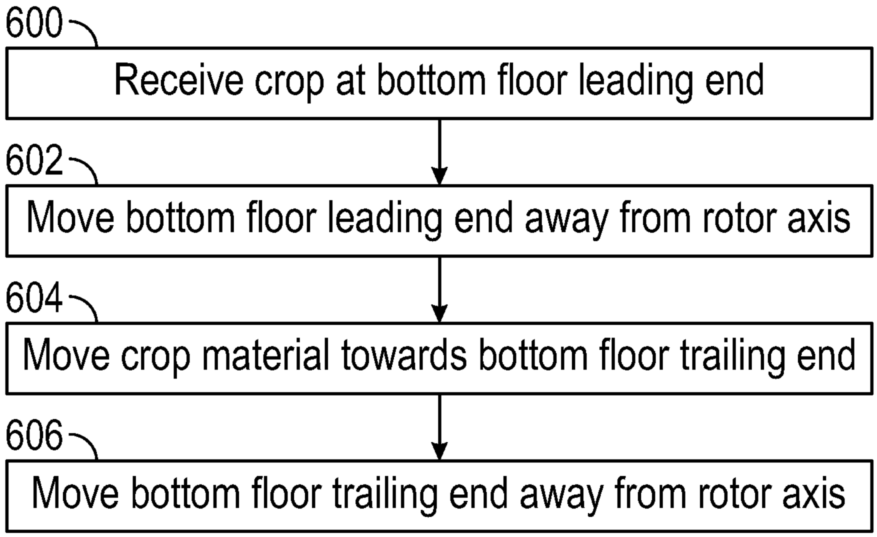
FIG. 6 is a block diagram of an exemplary method for operating a harvester assembly.

From the foregoing, it will be understood that the described embodiments provide useful and unique methods for addressing the issue of crop clogging and other obstructions in a harvester assembly 200, such as those used in balers and similar equipment. In brief, and as shown in FIG. 6, the method includes receiving the crop material in the crop flow passage 218 at the bottom floor leading end 216*a* (step 600), moving the bottom floor leading end 216*a* away from the rotor axis 208 by a force generated at a first location on the bottom floor 216 (e.g., in front of the rocker axis 224) by the crop material (step 602); moving the crop material towards the bottom floor trailing end 216*b* (step 604); and moving the bottom floor trailing end 216*b* away from the rotor axis 208 by a second force generated at a second location on the bottom floor 216 (e.g. behind the rocker axis 224) by the crop material (step 606). During such process, the single respective actuators 230 may be operated to move the bottom floor trailing end 216*b* away from the rotor axis to help permit the crop material to pass through the crop flow passage 218.

Embodiments such as described herein can provide significant benefits over known mechanisms for addressing crop plugging and the like in harvesting assemblies and systems. For example, when operating with the actuator fully contracted, a conventional movable bottom floor that pivots at a single location might provide about 10 millimeters (mm) of drop at the bottom floor leading end and about 43 mm of drop at the bottom floor trailing end, whereas an embodiment as described herein might provide about 24 mm of drop at the bottom floor leading end and about 35 mm of drop at the bottom floor trailing end, yielding an overall increase in expansion of the crop flow passage to permit obstructions to pass. Similarly, when operating with the actuator in the fully-extended position, a conventional movable bottom floor that pivots at a single location might provide about 10 mm of drop at the bottom floor leading end (the same as when the actuator is retracted) and about 161 mm of drop at the bottom floor trailing end, whereas an embodiment as described herein might provide about 50 mm of drop at the bottom floor leading end, and about 153 mm of drop at the bottom floor trailing end, which again yields a net improvement in expansion of the crop flow passage to permit obstructions to pass.

Additionally, embodiments such as described herein provide more degrees of articulation than a convention single-pivot bottom floor, and offer somewhat independent "floating" movement of the bottom floor leading and trailing ends to allow the bottom floor to displace at a location that generally follows the location of the obstruction. This can help maintain more efficient operation of the harvesting assembly while processing an obstruction, and provide other possible benefits.

Still further, the floating action of the bottom floor preferably can be obtained using a single actuator at each lateral end of the bottom floor assembly. This overcomes the additional cost and service requirements of conventional multi-pivot or articulated bottom floors that require multiple actuators at each end of the bottom floor.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

It should be noted that the term "exemplary" and variations thereof, as used herein to describe various embodiments, are intended to indicate that such embodiments are possible examples, representations, or illustrations of possible embodiments. Such terms are not intended to connote that such embodiments are necessarily extraordinary or superlative examples.

Except as otherwise made clear by principles of differentiation or specific narrowing language, the terms "coupled," "operatively coupled," and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic or a combination thereof.

The operation and advantages, as well as other options and variations, of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. An agricultural machine comprising:

a chassis;

a rotor operatively connected to the chassis to rotate about a rotor axis in a rotation direction;

a bottom floor located adjacent to the rotor and extending along the rotor axis from a first lateral side to a second lateral side, the bottom floor extending along the rotation direction from a bottom floor leading end to a bottom floor trailing end, wherein the bottom floor is spaced from the rotor to define a crop flow passage between the rotor and the bottom floor; and a respective linkage operatively connecting each lateral side of the bottom floor to the chassis and configured to allow the bottom floor to move about multiple rotation axes to move away from the rotor axis by application of force generated against the bottom floor in the crop flow passage.

2. The agricultural machine of claim 1, further comprising a single respective actuator operatively connected at each lateral side of the bottom floor, and being operable to move the bottom floor trailing end towards and away from the rotor axis.

3. The agricultural machine of claim 1, further comprising a first stop surface positioned on the chassis to stop movement of the bottom floor leading end towards the rotor axis.

4. The agricultural machine of claim 1, further comprising a second stop surface positioned on the chassis to stop movement of the bottom floor trailing end towards the rotor axis.

5. The agricultural machine of claim 4, wherein the second stop surface defines a first surface and the bottom floor comprises a second surface configured to slide on the first surface.

6. The agricultural machine of claim 1, wherein the respective linkage at the first lateral side and/or the second lateral side comprises:

a rocker arm;

a rocker pivot connecting the rocker arm to the chassis to rotate about a rocker axis; and a bottom floor pivot connecting the rocker arm to the bottom floor to rotate about a bottom floor axis.

7. The agricultural machine of claim 6, wherein the bottom floor pivot is located adjacent to the bottom floor leading end.

8. The agricultural machine of claim 6, further comprising a single respective actuator operatively connected at each lateral side of the bottom floor, and being operable to move the bottom floor trailing end towards and away from the rotor axis, wherein the respective single actuator at the first lateral side comprises:

a first operating end operatively connected to the rocker arm, and a second operating end operatively connected to the bottom floor such that operation of the single respective actuator to move the first operating end relative to the second operating end causes the bottom floor to rotate relative to the rocker arm about the bottom floor pivot.

9. The agricultural machine of claim 8, wherein the rocker pivot is located along the rocker arm between the bottom floor pivot and the first operating end.

10. The agricultural machine of claim 8, wherein:

the first operating end is movably secured to the rocker arm between a first position and a second position; and the second operating end is movable away from the rotor axis by movement of the first operating end from the first position to the second position.

11. The agricultural machine of claim 10, further comprising a spring configured to bias the first operating end towards the first position.

12. The agricultural machine of claim 11, wherein the first operating end comprises a shaft that extends from a proximal shaft end at the first operating end, through a bearing mounted to the rocker arm, and to a distal shaft end spaced from the first operating end, and the spring is mounted between the bearing and the distal shaft end.

13. The agricultural machine of claim 1, further comprising a bale forming chamber located downstream of the rotor and bottom floor to receive crop material exiting the crop flow passage.

14. A method of operating an agricultural machine comprising a chassis; a rotor operatively connected to the chassis to rotate about a rotor axis in a rotation direction; a bottom floor located adjacent to the rotor and extending along the rotor axis from a first lateral side to a second lateral side, the bottom floor extending along the rotation direction from a bottom floor leading end to a bottom floor trailing end, wherein the bottom floor is spaced from the rotor to define a crop flow passage between the rotor and the bottom floor; and a respective linkage operatively connecting each lateral side of the bottom floor to the chassis and configured to allow the bottom floor leading end and the bottom floor trailing end to move away from the rotor axis by application of force generated against the bottom floor in the crop flow passage, the method comprising:

receiving crop material in the crop flow passage at the bottom floor leading end;

moving the bottom floor leading end away from the rotor axis by a force generated at a first location on the bottom floor by the crop material;

moving the crop material towards the bottom floor trailing end; and moving the bottom floor trailing end away from the rotor axis by a force generated at a second location on the bottom floor by the crop material.

15. The method of claim 14, wherein the agricultural machine further includes a single respective actuator operatively connected at each lateral side of the bottom floor, and being operable to move the bottom floor trailing end towards and away from the rotor axis, and the method further comprises operating each single respective actuator to move the bottom floor trailing end away from the rotor axis.

16. An agricultural machine comprising:

a chassis;

a rotor operatively connected to the chassis to rotate about a rotor axis in a rotation direction;

a bottom floor located adjacent to the rotor and extending along the rotor axis from a first lateral side to a second lateral side, the bottom floor extending along the rotation direction from a bottom floor leading end to a bottom floor trailing end, wherein the bottom floor is spaced from the rotor to define a crop flow passage between the rotor and the bottom floor;

a respective linkage operatively connecting each lateral side of the bottom floor to the chassis and configured to allow the bottom floor to move about multiple rotation axes to move away from the rotor axis by application of force generated against the bottom floor in the crop flow passage; and a first stop surface positioned on the chassis to stop movement of the bottom floor leading end towards the rotor axis.

17. The agricultural machine of claim 16, further comprising a second stop surface positioned on the chassis to stop movement of the bottom floor trailing end towards the rotor axis.

18. The agricultural machine of claim 17, wherein the second stop surface defines a first surface and the bottom floor comprises a second surface configured to slide on the first surface.

* * * * *